United States Patent
Kim et al.

(10) Patent No.: US 10,518,715 B2
(45) Date of Patent: Dec. 31, 2019

(54) VEHICLE MOUNTING DEVICE FOR SURVEILLANCE EQUIPMENT

(71) Applicant: SEHWA MOTOR CO., LTD., Hwaseong-si, Gyeonggi-do (KR)

(72) Inventors: Dong Geun Kim, Hwaseong-si (KR); Seong Joo Kang, Hwaseong-si (KR)

(73) Assignee: SEHWA MOTOR CO., LTD., Hwaseong-si, Gyeonggi-do (KR)

( * ) Notice: Subject to any disclaimer, the term of this patent is extended or adjusted under 35 U.S.C. 154(b) by 0 days.

(21) Appl. No.: 16/079,097

(22) PCT Filed: Feb. 23, 2017

(86) PCT No.: PCT/KR2017/001992
§ 371 (c)(1),
(2) Date: Aug. 23, 2018

(87) PCT Pub. No.: WO2017/146480
PCT Pub. Date: Aug. 31, 2017

(65) Prior Publication Data
US 2019/0047484 A1 Feb. 14, 2019

(30) Foreign Application Priority Data
Feb. 26, 2016 (KR) .......... 10-2016-0023365

(51) Int. Cl.
*B60R 11/00* (2006.01)
*H01Q 1/18* (2006.01)
(Continued)

(52) U.S. Cl.
CPC ............ *B60R 11/00* (2013.01); *B62D 27/06* (2013.01); *F16M 11/20* (2013.01); *G01J 5/00* (2013.01);
(Continued)

(58) Field of Classification Search
CPC ........ B60R 11/00; B62D 27/06; F16M 11/20; G01J 5/00; G01J 5/0025; G01S 13/86; G01S 13/89; H01Q 1/18
(Continued)

(56) References Cited

U.S. PATENT DOCUMENTS 8,261,954 B2 * 9/2012 Lee ................. B60R 11/0258
224/282
8,613,379 B2 * 12/2013 Lee ..................... B62J 11/00
224/282
(Continued)

FOREIGN PATENT DOCUMENTS

JP 10-029469 A 2/1998
JP 2003-002137 A 1/2003
(Continued)

OTHER PUBLICATIONS

International Search Report in International Application No. PCT/KR2017/001992 dated May 30, 2017.

*Primary Examiner* — Peter N Helvey
(74) *Attorney, Agent, or Firm* — Park, Kim & Suh, LLC

(57) ABSTRACT

The present invention relates to a surveillance equipment mounting device for a vehicle, the device including: a pillar vertically provided on a floor of a vehicle; and a support member horizontally provided on a top end of the pillar and having a substantially ' ⌐ ' shape, wherein the support member is configured such that a first side section is shorter than a second side section with respect to the top end of the pillar, the first side section has an end provided with a first mounting part on which the equipment is mounted, and the second side section has an end provided with a second mounting part, the first mounting part being provided at a position lower than the second mounting part.

6 Claims, 10 Drawing Sheets

(51) Int. Cl.
*G01J 5/00* (2006.01)
*H01Q 1/32* (2006.01)
*G01S 13/86* (2006.01)
*F16M 11/20* (2006.01)
*H01Q 1/12* (2006.01)
*B62D 27/06* (2006.01)
*G01S 13/89* (2006.01)
*G01S 13/02* (2006.01)
*G01S 7/02* (2006.01)

(52) U.S. Cl.
CPC ............. *G01J 5/0025* (2013.01); *G01S 13/86* (2013.01); *G01S 13/89* (2013.01); *H01Q 1/1228* (2013.01); *H01Q 1/18* (2013.01); *H01Q 1/3233* (2013.01); *H01Q 1/3291* (2013.01); *B60R 2011/0029* (2013.01); *B60R 2011/0052* (2013.01); *B60R 2011/0066* (2013.01); *B60R 2011/0082* (2013.01); *B60R 2011/0085* (2013.01); *B60R 2011/0092* (2013.01); *B60R 2300/107* (2013.01); *B60R 2300/301* (2013.01); *G01J 2005/0077* (2013.01); *G01S 13/0218* (2013.01); *G01S 2007/027* (2013.01)

(58) Field of Classification Search
USPC .......................................................... 224/282
See application file for complete search history.

(56) References Cited

U.S. PATENT DOCUMENTS

| | | | |
|---|---|---|---|
| 8,857,687 B1* | 10/2014 | An | ........................... B60R 11/02 224/282 |
| 2011/0006091 A1* | 1/2011 | Schafer | ................... B60R 11/00 224/282 |
| 2014/0204218 A1* | 7/2014 | Gebhard | ................. F21V 21/30 348/164 |

FOREIGN PATENT DOCUMENTS

| KR | 10-2005-0037901 A | 4/2005 |
|---|---|---|
| KR | 10-2012-0008349 A | 1/2012 |
| KR | 10-1305445 B1 | 9/2013 |
| KR | 10-2015-0118720 A | 10/2015 |

* cited by examiner

VEHICLE MOUNTING DEVICE FOR SURVEILLANCE EQUIPMENT

CROSS-REFERENCE TO RELATED APPLICATIONS

This application is the National Stage filing under 35 U.S.C. 371 of International Application No. PCT/KR2017/001992, filed on Feb. 23, 2017, which claims the benefits of Korean Patent Application No. 10-2016-0023365, filed on Feb. 26, 2016, the contents of which are all hereby incorporated by reference herein in their entirety.

TECHNICAL FIELD

The present invention relates generally to a surveillance equipment mounting device for a vehicle. More particularly, the present invention relates to a surveillance equipment mounting device for a vehicle, wherein a thermal observation device and radar are easily mounted on a vehicle, a surveillance range is stably secured, and superior operability is provided through easy attachment and detachment.

BACKGROUND ART

Among vehicle-mounted surveillance equipment, a thermal observation device (TOD) is a device that detects infrared rays of an object and converts the same into a video image. It is mainly used for identification of location and dynamics of moving persons and targets during night, and for detection of hidden places.

Furthermore, among the vehicle-mounted surveillance equipment, long-range ground surveillance radar is used to detect moving persons and vehicles within a range of 20 km. The surveillance equipment is mounted in a vehicle for carrying out surveillance and reconnaissance work at a desired place. The carrying out of surveillance work using surveillance equipment that is mounted in a fixed location poses a danger of revealing a position to enemies, and thus the location must be kept hidden upon an infiltration operation. However, the carrying out of surveillance work using mobile surveillance equipment enables movement to a desired place and thus reduces exposure to enemies. Thus, a wide surveillance range effect is achieved by using a single equipment, leading to potentially valuable use in many other applications. It is noted that as a technique of mounting surveillance equipment in a vehicle, a gun cradle is disclosed in Korean Patent Application No. 10-2011-0067418. The gun cradle is comprised of a vertically installed cradle pillar and a gun support device, and is related to a configuration in which a machine gun is mounted to be pivotable.

Meanwhile, surveillance equipment includes a thermal device or radar for reconnaissance work during daytime and nighttime and may be used as a stationary type or as a mobile type mounted in a vehicle. The type of mounting surveillance equipment in a vehicle in the related art is mainly composed of a type mounted in trucks or vans.

However, in the related art, vibration resistance against shaking due to impact generated during vehicle running may be inadequate in a country like Korea that consists of mountainous terrain and many roads and small roads with steep slopes. Additionally, large angle variation is required in mountainous terrain, but this angle variation may not be freely realized.

DISCLOSURE

Technical Problem

Accordingly, the present invention has been made keeping in mind the above problems occurring in the related art, and an objective of the present invention is to provide a surveillance equipment mounting device for a vehicle, wherein a thermal observation device and radar are mountable on a four-wheel drive vehicle used on rough mountainous roads, and the thermal observation device and radar are easily mounted on the vehicle, a surveillance range is stably secured, and superior operability is provided through easy attachment and detachment.

Technical Solution

In order to accomplish the above objective, according to an embodiment of the present invention, there is provided a surveillance equipment mounting device for a vehicle, the device including: a pillar vertically provided on a floor of a vehicle; and a support member horizontally provided on a top end of the pillar and having a substantially 'ᅟ⌐' shape, wherein the support member is configured such that a first side section is shorter than a second side section with respect to the top end of the pillar, the first side section has an end provided with a first mounting part on which the equipment is mounted, and the second side section has an end provided with a second mounting part, the first mounting part being provided at a position lower than the second mounting part.

According to the embodiment of the present invention, the pillar may have a rotary member provided on the top end thereof so as to rotate the support member.

According to the embodiment of the present invention, the rotary member may include: multiple rotary plates rotatably coupled to an upper inside of the pillar; an intermediate plate coupled to the multiple rotary plates in an overlapping manner; and a braking operation member provided on an outside of the pillar and configured to restrict or release rotation of the intermediate plate to selectively exert a braking force thereon.

According to the embodiment of the present invention, the braking operation member may include a friction groove formed on an outer circumferential surface of the intermediate plate, a friction pad coupled through the pillar and having an end inserted into the friction groove, the friction pad exerting the braking force, a shaft connected to the friction pad, and a handle connected to an end of the shaft to protrude outwardly of the support member, wherein the friction pad may be allowed to be brought into contact with or distanced from the friction groove.

Advantageous Effects

According to the present invention, the following effects can be provided: the thermal observation device and radar can be mountable on the four-wheel drive vehicle used on rough mountainous roads; and the thermal observation device and radar can be easily mounted on the vehicle; the surveillance range can be stably secured; and superior operability can be provided through easy attachment and detachment.

Furthermore, mobile surveillance equipment according to the present invention provides movement to a desired place upon surveillance work and thus can reduce exposure to enemies. Thus, a wide surveillance range effect can be achieved by using a single equipment, leading to potentially valuable use in many other applications.

BEST MODE

Figure 1:
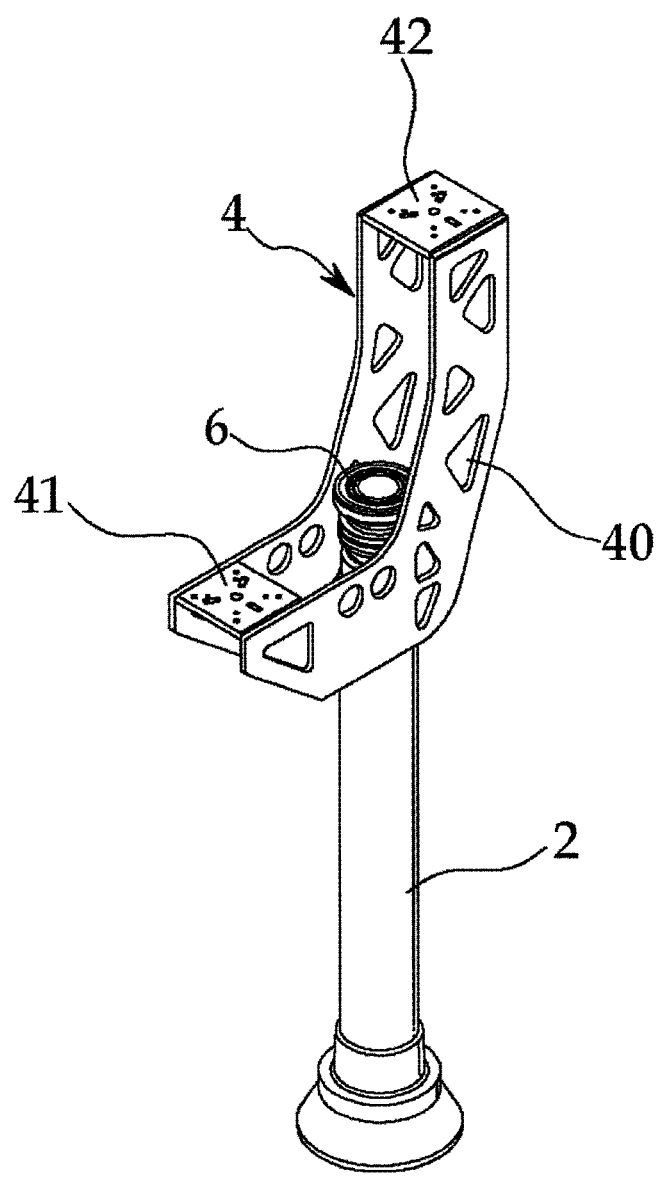
FIG. 1 is a perspective view showing a surveillance equipment mounting device for a vehicle according to a first embodiment of the present invention.

In order to achieve the above objective, an embodiment of the present invention includes: a pillar vertically provided on a floor of a vehicle; and a support member horizontally provided on a top end of the pillar and having a substantially '⌐' shape, wherein the support member is configured such that a first side section is shorter than a second side section with respect to the top end of the pillar, the first side section has an end provided with a first mounting part on which the equipment is mounted, and the second side section has an end provided with a second mounting part, the first mounting part being provided at a position lower than the second mounting part.

Mode for Invention

Hereinbelow, exemplary embodiments of the present invention will be described in detail with reference to the accompanying drawings. Throughout the drawings, the same reference numerals will refer to the same or like parts. Further, it is to be noted that, when the functions of conventional elements and the detailed description of elements related with the present invention may make the gist of the present invention unclear, a detailed description of those elements will be omitted.

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiment 1

Figure 2:
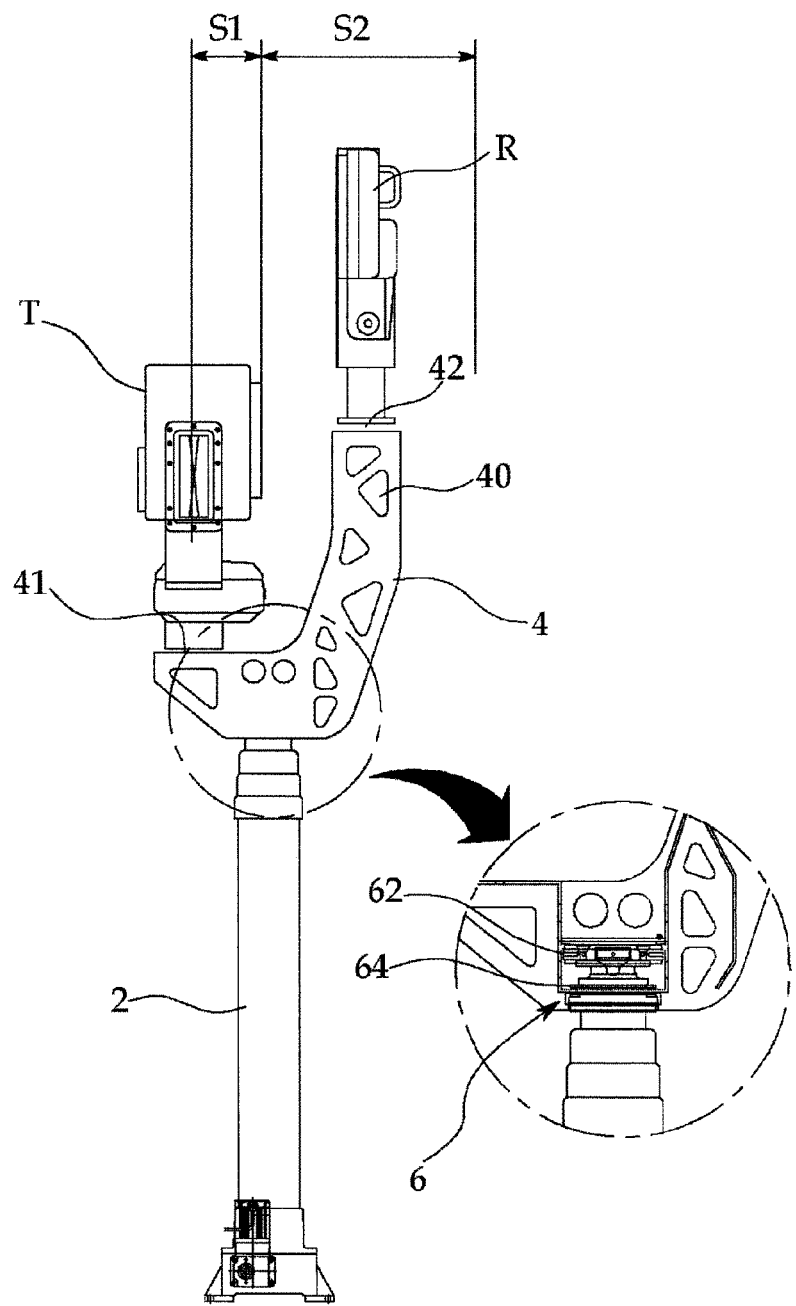
FIG. 2 is a front view showing the surveillance equipment mounting device for a vehicle according to the first embodiment of the present invention.
Figure 3:
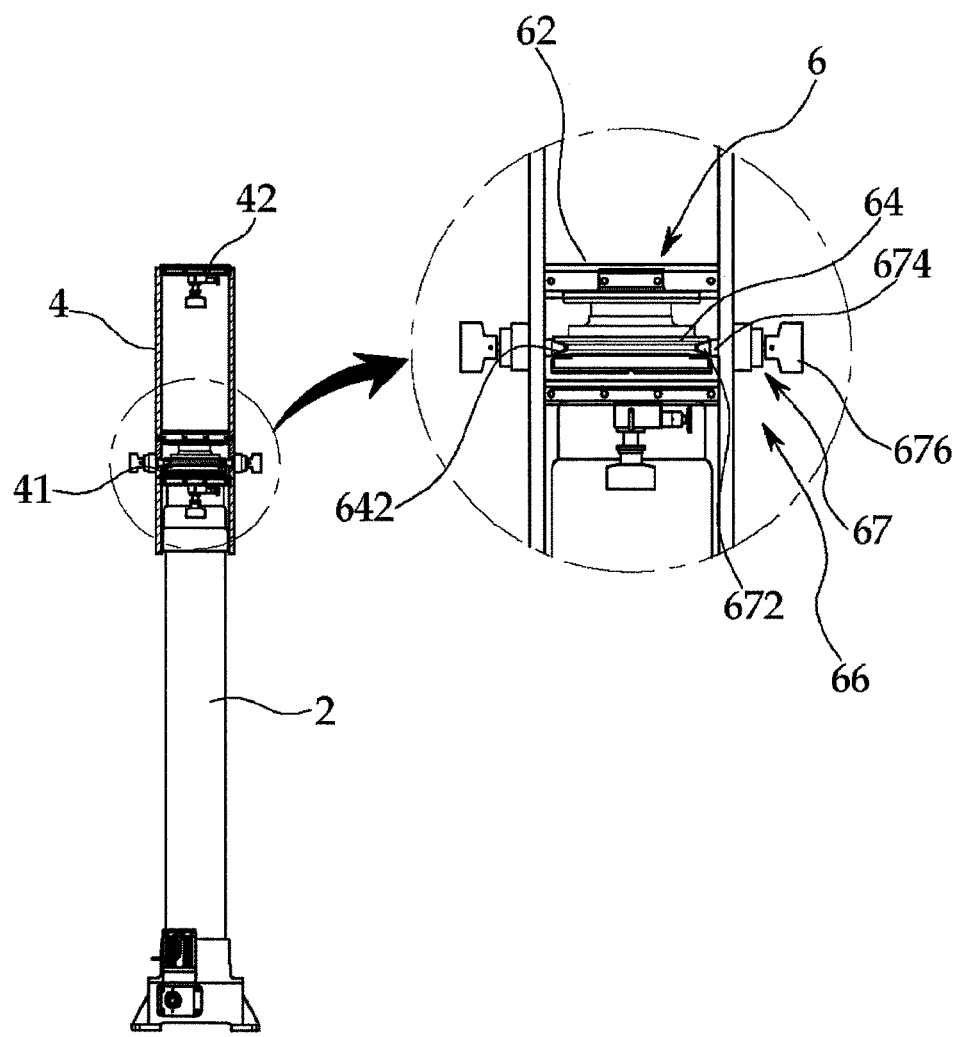
FIG. 3 is a side view showing the surveillance equipment mounting device for a vehicle according to the first embodiment of the present invention.
Figure 4:
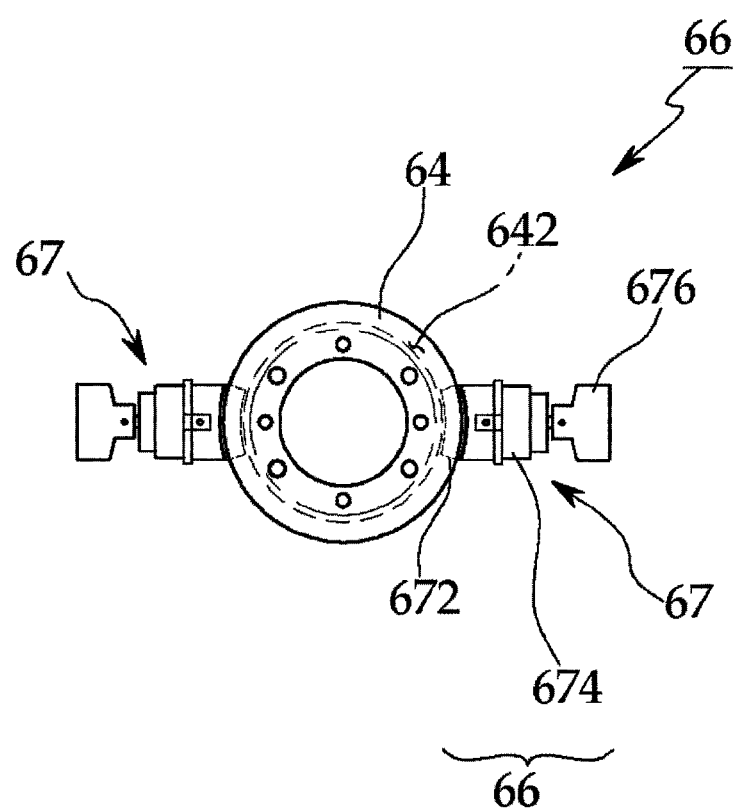
FIG. 4 is an enlarged plan view showing a braking operation member in the surveillance equipment mounting device for a vehicle according to the first embodiment of the present invention.
Figure 5:
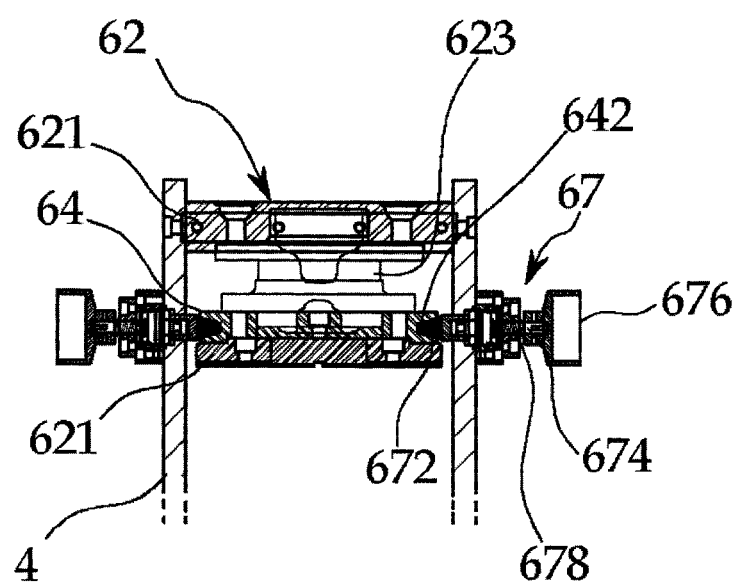
FIG. 5 is an enlarged sectional view showing the braking operation member in the surveillance equipment mounting device for a vehicle according to the first embodiment of the present invention.
Figure 6:
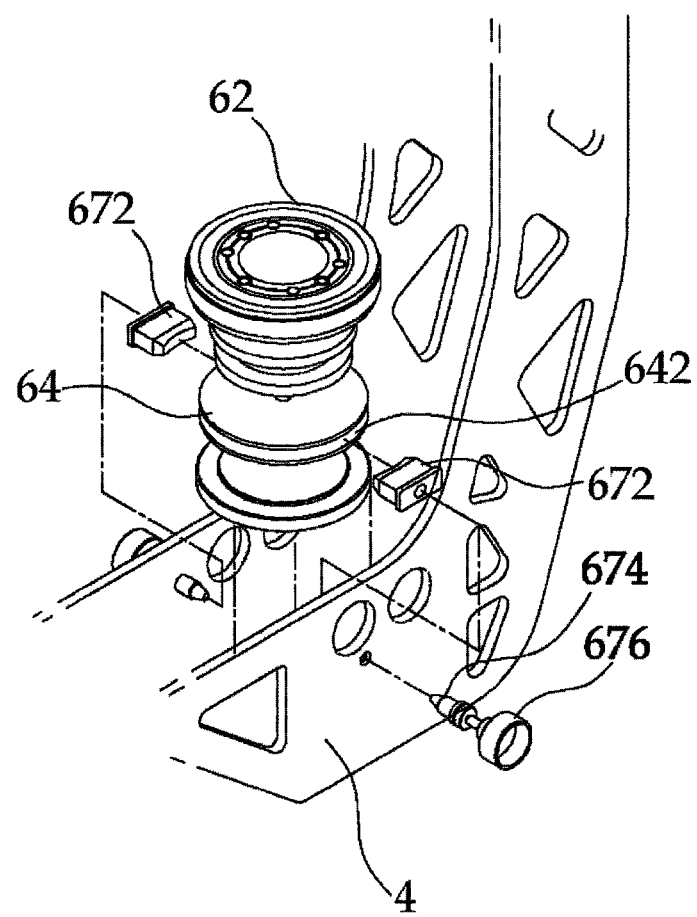
FIG. 6 is an enlarged exploded perspective view showing the braking operation member in the surveillance equipment mounting device for a vehicle according to the first embodiment of the present invention.
Figure 7:
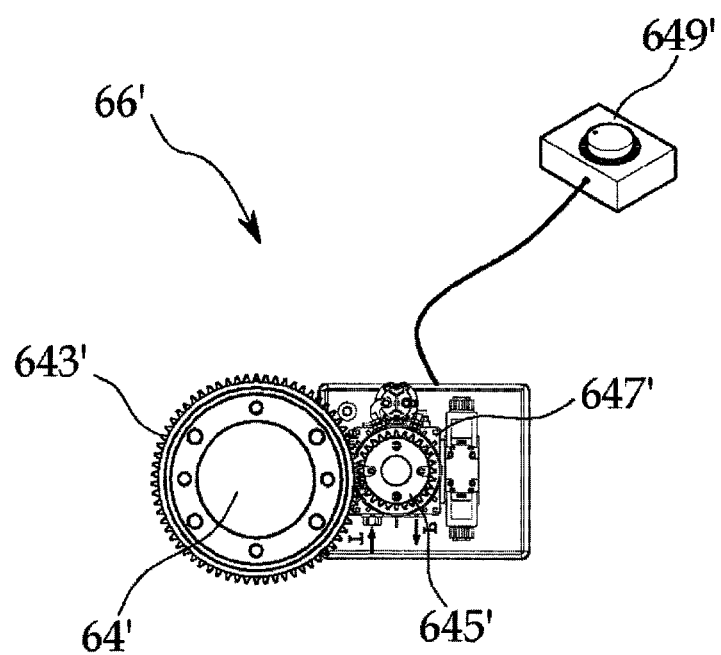
FIG. 7 is a plan view showing another example of a braking operation member in the surveillance equipment mounting device for a vehicle according to the first embodiment of the present invention.

In the accompanying drawings, FIG. 1 is a perspective view showing a surveillance equipment mounting device for a vehicle according to a first embodiment of the present invention, FIG. 2 is a front view showing the surveillance equipment mounting device for a vehicle according to the first embodiment of the present invention, FIG. 3 is a side view showing the surveillance equipment mounting device for a vehicle according to the first embodiment of the present invention, FIG. 4 is an enlarged plan view showing a braking operation member in the surveillance equipment mounting device for a vehicle according to the first embodiment of the present invention, FIG. 5 is an enlarged sectional view showing the braking operation member in the surveillance equipment mounting device for a vehicle according to the first embodiment of the present invention, FIG. 6 is an enlarged exploded perspective view showing the braking operation member in the surveillance equipment mounting device for a vehicle according to the first embodiment of the present invention, and FIG. 7 is a plan view showing another example of a braking operation member in the surveillance equipment mounting device for a vehicle according to the first embodiment of the present invention.

A surveillance equipment mounting device for a vehicle according to an embodiment of the present invention includes: a pillar 2 vertically provided on a floor of a vehicle; and a support member 4 horizontally provided on a top end of the pillar 2 and having a substantially '⌐' shape.

The support member 4 has surveillance equipment T and R respectively mounted on opposite ends thereof.

The pillar 2 is configured with multiple pillar rods fitted to each other in a telescopic manner such that a lower end thereof is fixedly mounted on the floor of a vehicle, that is, on the bottom of a rear seat or on the bottom of a loading box while the pillar extends in length upward.

The support member 4 is mounted on the top end of the pillar 2 such that opposite sides of the '⌐' shape differ from each other in length.

As shown in FIG. 2, the support member 4 is configured such that a first side section S1 is shorter than a second side section S2 with respect to the top end of the pillar 2. The first side section S1 has an end provided with a first mounting part 41 on which the equipment is mounted, and the second side section S2 has an end provided with a second mounting part 42 on which the equipment is mounted, the first mounting part 41 being provided at a position lower than the second mounting part 42.

Accordingly, the surveillance equipment T that is mounted on the first mounting part 41 provided on the short first side section has a higher load than the surveillance equipment R mounted on the second mounting part 42.

Herein, the surveillance equipment T is a thermal observation device and the surveillance equipment R is radar.

Furthermore, the support member 4 has multiple through holes 40 formed therein to enable weight reduction. Provision of the through holes 40 is not necessarily required, but the multiple through holes are formed so as to reduce the resistance against wind when the pillar 2 extends in length as well as reducing the weight.

Meanwhile, the pillar 2 has a rotary member 6 provided on the top end thereof so as to rotate the support member 4.

The rotary member 6 includes: multiple rotary plates 62 rotatably coupled to an upper inside of the pillar 2; an intermediate plate 64 coupled to the multiple rotary plates 62 in an overlapping manner; and a braking operation member 66 provided on an outside of the pillar 2 and configured to restrict or release rotation of the intermediate plate 64 to selectively exert a braking force thereon.

The multiple rotary plates 62 are configured with an upper rotary plate 621 and a lower rotary plate 622, and the intermediate plate 64 is interposed therebetween. The intermediate plate 64 and the upper rotary plate 621 are connected to each other by a bearing 623.

In an example of the braking operation member 66, a friction groove 642 is circumferentially recessed on an outer circumferential surface of the intermediate plate 64 at a predetermined depth. The friction groove 642 has a trapezoidal shape in cross section.

Furthermore, an adjustment device 67 is coupled through the pillar 2.

The adjustment device 67 is configured with a friction pad 672 having an end inserted into the friction groove 642, the friction pad exerting the braking force, a shaft 674 connected to the friction pad 672, and a handle 676 connected to an end of the shaft 674 to protrude outwardly of the support member 4.

The shaft 674 has a spring 678 coupled thereto to exert an elastic force.

Accordingly, when the handle 676 is gripped and pulled outward, the friction pad 672 is removed from the friction groove 642 of the intermediate plate 64, whereby the braking force is released.

When the handle 676 having been pulled is released, the friction pad 672 is moved forward due to an elastic restoring force of the spring 678 exerting thereon to be brought into contact with the friction groove 642 of the intermediate plate 64, whereby the braking force is exerted.

On the other hand, a braking operation member 66' according to another example is driven electrically.

In other words, the braking operation member 66' is configured such that an intermediate plate 64' has a tooth gear portion 643' formed on an outer circumferential surface thereof around an entire portion of an circumference thereof or around a partially arcuate portion of the circumference thereof.

A motor 647' is provided with a pinion gear 645' that is meshed with the tooth gear portion 643' to be rotatable.

Furthermore, a controller 649' is provided to control a rotational speed and a rotation angle of the motor 647'.

The controller 649' is operated by a user manually or remotely from outside, the controller allowing the rotational speed of the motor to be freely controlled to a desired level.

An example of manual operation of the controller 649' may be a dial button or a joystick, etc., while an example of remote operation thereof may be implemented by various methods such as an input method using a program installed on a computer.

The operation of the present invention configured as described above will now be described.

The support member 4 is mounted on the top end of the pillar 2 such that the first mounting part 41 and the second mounting part 42 have a height difference, and thus the first mounting part 41 is located at a position lower than the second mounting part 42.

The first mounting part 41 has heavy load equipment mounted thereon, while and the second mounting part 42 has light load equipment mounted thereon.

The rotary member 6 is mounted at a portion where the top end of the pillar 2 and the support member 4 are connected to each other.

The shaft 674 of the handle 676 constituting the brake operation member 66 is coupled through the support member 4, and the friction pad 672 is positioned on the friction groove 642 of the intermediate plate 64 and then is connected to the shaft 674 of the handle 676.

Accordingly, when the handle 676 is pulled, the friction pad 672 is distanced from the friction groove 642 and thus the braking force is released, resulting in the support member 4 being freely rotatable.

When a force exerted to pull the handle is released after a desired angle is set, the friction pad 672 is brought into close contact with the friction groove 642 due to the elastic restoring force of the spring 678 exerting thereon and thus enters a braking state. This makes it possible securely maintain the set angle all the time.

On the other hand, the braking operation member 66 of an electrically-driven type may be employed and a description thereof has been given above, so that a redundant description will be omitted.

The electrically-driven type enables that operation time is shortened and unmanned operation is performed while enabling precisely control.

Embodiment 2

Figure 8:
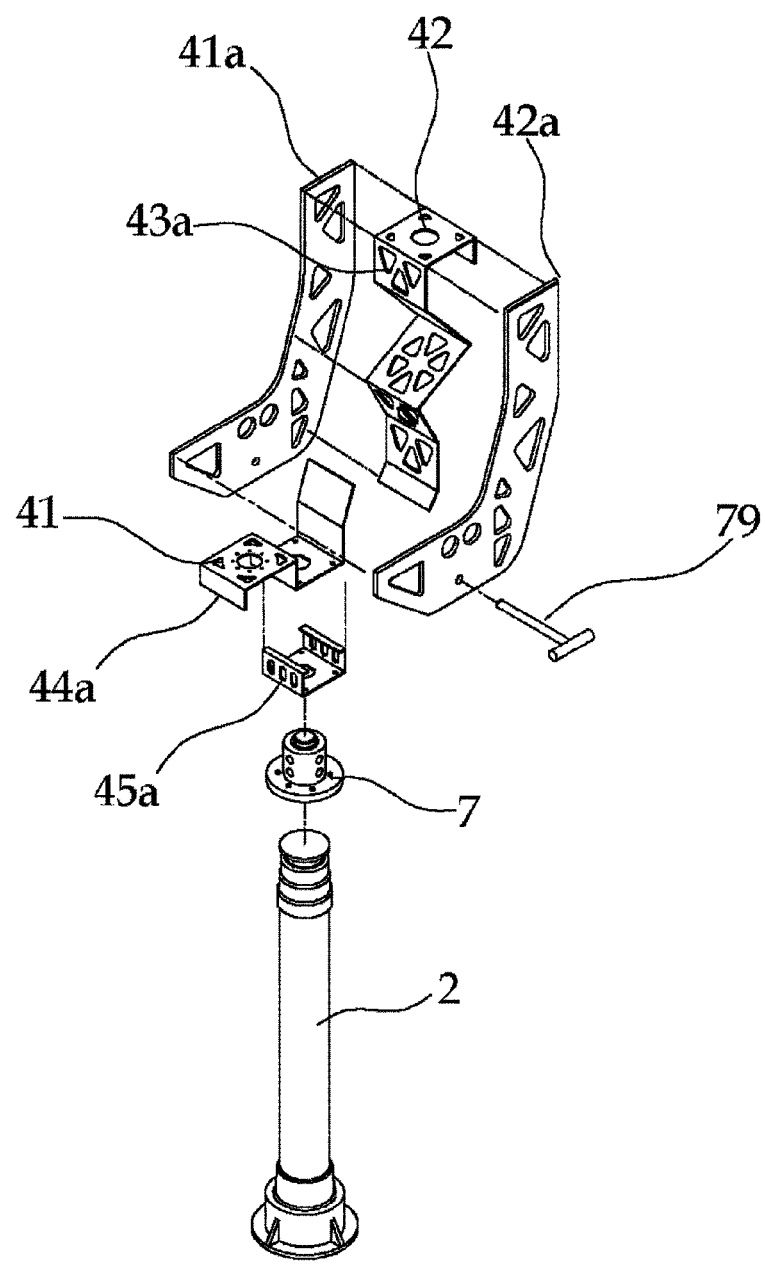
FIG. 8 is an exploded perspective view showing a surveillance equipment mounting device for a vehicle according to a second embodiment of the present invention.
Figure 9:
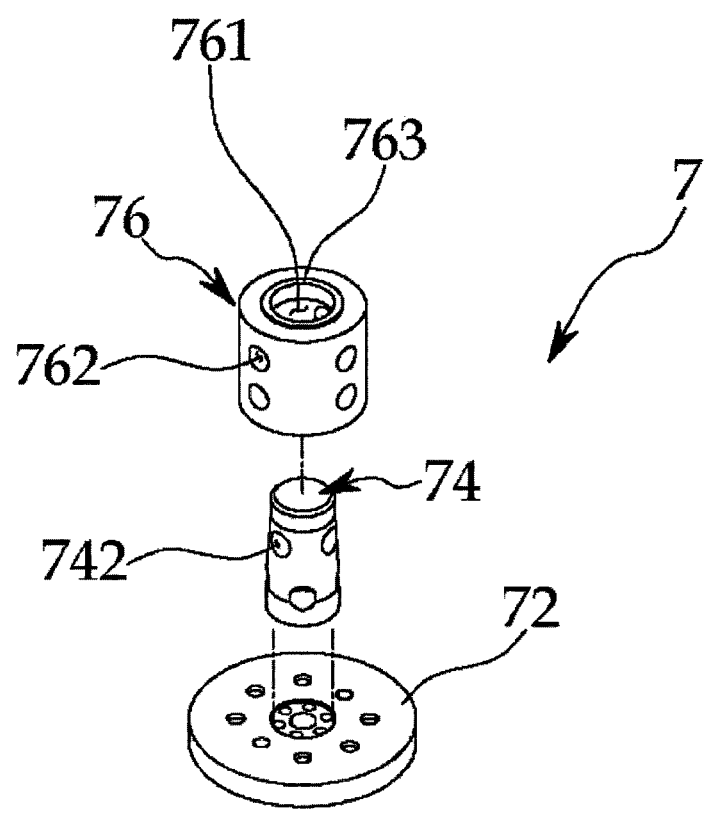
FIG. 9 is an enlarged exploded perspective view showing a rotary member in the surveillance equipment mounting device for a vehicle according to the second embodiment of the present invention.
Figure 10:
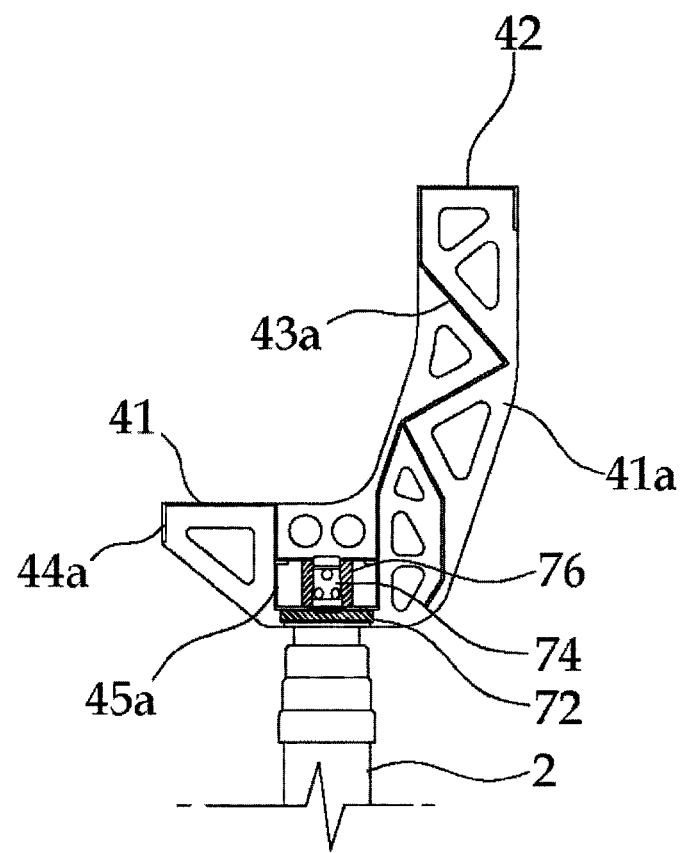
FIG. 10 is an assembled front view showing the surveillance equipment mounting device for a vehicle according to the second embodiment of the present invention.

FIG. 8 is an exploded perspective view showing a surveillance equipment mounting device for a vehicle according to a second embodiment of the present invention, FIG. 9 is an enlarged exploded perspective view showing a rotary member in the surveillance equipment mounting device for a vehicle according to the second embodiment of the present invention, and FIG. 10 is an assembled front view showing the surveillance equipment mounting device for a vehicle according to the second embodiment of the present invention.

As shown in FIGS. 8 to 10, a surveillance equipment mounting device for a vehicle according to a second embodiment of the present invention includes: a pillar 2 vertically provided on a floor of a vehicle; and a support member 4 having a substantially arced shape and horizontally provided on a top end of the pillar 2.

The pillar 2 is configured with multiple pillar rods fitted to each other in a telescopic manner such that a lower end thereof is fixedly mounted on the floor of a vehicle, that is, on the floor of a rear seat or on the floor of a loading box while the pillar extends in length upward.

The support member 4 is mounted on the top end of the pillar 2 such that opposite sides of the ' ⌐ ' shape differ from each other in length.

The support member 4 is configured such that a first side section S1 is shorter than a second side section S2 with respect to the top end of the pillar 2. The first side section S1 has an end provided with a first mounting part 41 on which the equipment is mounted, and the second side section S2 has an end provided with a second mounting part 42 on which the equipment is mounted, the first mounting part 41 being provided at a position lower than the second mounting part 42.

Accordingly, the surveillance equipment T that is mounted on the first mounting part 41 provided on the short first side section has a higher load than the surveillance equipment R mounted on the second mounting part 42. Herein, the surveillance equipment T is a thermal observation device and the surveillance equipment R is radar.

Furthermore, the support member 4 includes: a '⌐'-shaped first plate 41*a*; a second plate 42*a* having the same shape as the first plate 41*a* and distanced therefrom at a predetermined interval; a first reinforcing portion 43*a* mounted between the first and second plates 41*a* and 42*a* and having a top end provided with a first mounting part 41, the first reinforcing portion being formed of multiple bent plates; a second reinforcing portion 44*a* mounted between the first and second plates 41*a* and 42*a* and having a side provided with a second mounting part 42; and a rotary mounting portion 45*a* coupled to the second reinforcing portion 44*a* and to which a rotary member 7 is coupled.

The first and second reinforcing portions 43*a* and 44*a* are provided to define a truss structure, leading to an increase in a reinforcing force.

The rotary mounting portion 45*a* has a through hole centrally formed therein such that the rotary member 7 is coupled thereto. Accordingly, it is possible to rotate the support member 4 by 360 degrees.

The first and second plates 41*a* and 42*a*, the first and second reinforcing portions 43*a* and 44*a*, and the rotary mounting portion 45*a* have multiple through holes 40 formed therein so as to provide weight reduction.

The pillar 2 is provided on the top end thereof with the rotary member 7 such that the support member 4 is rotated.

The rotary member 7 includes: a rotary shaft base 72 rotatably coupled to an upper inside of the pillar 2; an inner rotary shaft 74 vertically provided and coupled to an upper portion of the rotary shaft base 72; and an outer rotary shaft 76 coupled to an outside of the inner rotary shaft 74 and supported by the rotary mounting portion 45*a*.

The inner rotary shaft 74 is configured such that a diameter thereof gradually decreases downward to define a tapered outer surface, and the outer surface has upper and lower portions each provided with multiple first holes 742 formed therein.

The outer rotary shaft 76 has upper and lower portions each provided with an opening hole 763 formed therein, the outer rotary shaft having a passage 761 formed therein to communicate with the opening hole. The passage 761 is configured such that a diameter thereof gradually decreases upward to define a tapered inner circumferential surface, and an outer surface thereof has upper and lower portions each provided with a second hole 762 formed therein.

The first holes 742 and the second holes 762 are formed at the same height and are formed to have the same diameter. Accordingly, the outer rotary shaft 76 is rotated such that the second holes 762 thereof and the first holes 742 of the inner rotary shaft 74 correspond to each other and then a pin 79 is inserted for securement, thereby enabling angle control.

It is preferable that the first holes 742 and the second holes 762 are formed at alternate angles. For example, four first holes 742 and four second holes 762 are formed such that respective holes are arranged at the upper and lower portions of the shafts to be staggered and alternating with one another. Accordingly, each of the four first holes 742 is formed at an angle of approximately 45 degrees relative to each of the four second holes 762. The rotary member 7 is secured by inserting the pin 79 such that the support member is secured at a desired angle set by a user.

According to the present invention, rotating the support member 4 having the truss structure by 360 degrees is possible. Due to this, in the case where a vehicle is parked in a narrow space and is difficult to move to a desired parking direction, the support member 4 is rotated toward the desired parking direction to determine a parking direction and then the pin 79 is inserted to secure the support member. Additionally, a self-rotation function (over 300 degrees) of the surveillance equipment enables surveillance in any direction, 360 degrees, thereby realizing a structure without a dead zone. In other words, the radar mounted on the second mounting part 42, which is located at a relatively high position, has a 360-degree range and thus is not obstructed. However, the thermal observation device mounted on the first mounting part 41, which is located at a relatively low position, is partially restricted in range due to the truss structure with the radar. Thus, due to provision of the rotation function of the surveillance equipment and the rotation function of the support member, it is possible to realize 360 degrees surveillance without forming the dead zone.

Although a preferred embodiment of the present invention has been described for illustrative purposes, those skilled in the art will appreciate that various modifications, additions and substitutions are possible, without departing from the scope and spirit of the invention as disclosed in the accompanying claims.

Industrial Applicability

The present invention can be used to mount a thermal observation device and radar in an attachable and detachable manner on a four-wheel drive vehicle used on rough mountainous roads.

The invention claimed is:

1. A surveillance equipment mounting device for a vehicle, the device being configured to mount surveillance equipment in an attachable and detachable manner and comprising:

a pillar vertically provided on a floor of a vehicle; and a support member horizontally provided on a top end of the pillar and having a substantially '⌐' shape, wherein the support member is configured such that a first side section is shorter than a second side section with respect to the top end of the pillar, the first side section has an end provided with a first mounting part on which the equipment is mounted, and the second side section has an end provided with a second mounting part, the first mounting part being provided at a position lower than the second mounting part, wherein the pillar has a rotary member provided on the top end thereof so as to rotate the support member, wherein the rotary member includes:
multiple rotary plates rotatably coupled to an upper inside of the pillar;
an intermediate plate coupled to the multiple rotary plates in an overlapping manner; and
a braking operation member provided on an outside of the pillar and configured to restrict or release rotation of the intermediate plate to selectively exert a braking force thereon, wherein the braking operation member includes a tooth gear portion formed on an outer circumferential surface of the intermediate plate, a gear meshed with the tooth gear portion, a motor rotating the gear, and a controller controlling rotation of the motor.

2. The device of claim 1, wherein the braking operation member includes a friction groove formed on an outer circumferential surface of the intermediate plate, a friction pad coupled through the pillar and having an end inserted into the friction groove, the friction pad exerting the braking force, a shaft connected to the friction pad, and a handle connected to an end of the shaft to protrude outwardly of the support member, wherein the friction pad is allowed to be brought into contact with or distanced from the friction groove.

3. A surveillance equipment mounting device for a vehicle, the device being configured to mount surveillance equipment in an attachable and detachable manner and comprising:

a pillar vertically provided on a floor of a vehicle; and a support member horizontally provided on a top end of the pillar and having a substantially '⌐' shape, wherein the support member includes:

a '⌐'-shaped first plate;

a second plate having the same shape as the first plate and distanced therefrom at a predetermined interval;

a first reinforcing portion mounted between the first and second plates and having a top end provided with a first mounting part, the first reinforcing portion being formed of multiple bent plates;

a second reinforcing portion mounted between the first and second plates and having a side provided with a second mounting part; and a rotary mounting portion coupled to the second reinforcing portion and to which a rotary member is coupled.

4. The device of claim 3, wherein the pillar is provided on the top end thereof with the rotary member such that the support member is rotated, and the rotary member includes:

a rotary shaft base rotatably coupled to an upper inside of the pillar;

an inner rotary shaft vertically provided and coupled to an upper portion of the rotary shaft base; and an outer rotary shaft coupled to an outside of the inner rotary shaft and supported by the rotary mounting portion; and a pin passing through the outer rotary shaft and the inner rotary shaft.

5. The device of claim 4, wherein the inner rotary shaft is configured such that a diameter thereof gradually decreases downward to define a tapered outer surface, and the outer surface has upper and lower portions each provided with multiple first holes formed therein to allow the pin to pass therethrough.

6. The device of claim 4, wherein the outer rotary shaft has upper and lower portions each provided with an opening hole formed therein, the outer rotary shaft having a passage formed therein to communicate with the opening hole, and the passage is configured such that a diameter thereof gradually decreases upward to define a tapered inner circumferential surface, and an outer surface thereof has upper and lower portions each provided with a second hole formed therein to allow the pin to pass therethrough.

* * * * *